United States Patent [19]

Sharma

[11] Patent Number: 4,549,012

[45] Date of Patent: Oct. 22, 1985

[54] FLUORINATED CELLULOSE ACETATE POLYMERS

[76] Inventor: Ashok K. Sharma, 1760 Lake St., St. Paul, Minn. 55113

[21] Appl. No.: 639,901

[22] Filed: Aug. 13, 1984

[51] Int. Cl.[4] .......................... C08B 3/06; C08B 3/22
[52] U.S. Cl. ...................................... 536/82; 536/69; 536/76; 210/500.2
[58] Field of Search ............................ 536/82, 76, 69; 210/500.2

[56] References Cited

U.S. PATENT DOCUMENTS

| | | | |
|---|---|---|---|
| 4,008,047 | 2/1977 | Petersen | 422/48 |
| 4,035,459 | 7/1977 | Kesting | 210/500.2 |
| 4,214,020 | 7/1980 | Ward et al. | 422/48 |
| 4,305,823 | 12/1981 | Batzer et al. | 210/500.2 |
| 4,318,785 | 3/1982 | Gunjima et al. | 210/500.2 |

FOREIGN PATENT DOCUMENTS 1120373  7/1968  United Kingdom ................... 536/82

OTHER PUBLICATIONS

Journal of Applied Polymer Science, vol. 29, No. 5, May 1984, pp. 1743–1748.

*Primary Examiner*—Ronald W. Griffin
*Attorney, Agent, or Firm*—Robert W. Doyle; Sten Erik Hakanson

[57] ABSTRACT

A new class of compounds, perfluoroacyl modified cellulose acetate polymers, has been synthesized. A novel method of preparation of these compounds is shown. It was discovered that these polymers can be used to form membranes having superior characteristics. The perfluoroacyl modification allows these polymers to be cast as ultrathin membranes resulting in improved gas flux rates while maintaining a high degree of selectivity, improved resistance to water, and the elimination of post treatment procedures. Furthermore these polymers can be spun as hollow fibers.

5 Claims, No Drawings

FLUORINATED CELLULOSE ACETATE POLYMERS

BACKGROUND OF THE INVENTION

1. Field of the Invention

This invention relates to cellulosic polymer compositions that can be formed into membranes, films, hollow fibers and other similar structures. An aspect of this invention relates to the use of these polymers as permselective membranes. Another aspect of this invention relates to the synthesis of perfluoroacyl modified cellulose acetates.

2. Description of the Prior Art

Cellulose, as is known in the art is a polymer made up of repeating saccharide (anhydroglucose) units linked at the 1 and 4 positions by betaglycocidic bonds. Numerous cellulosic polymers are known including cellulose acetate, carboxymethyl cellulose, hydroxyethyl cellulose, ethyl cellulose and so on. Perhaps no conventional polymer has found more applications in industrial membrane separations than cellulose acetate. In various forms it is, for example, used in sea water desalination, ultrafiltration, microfiltration, kidney dialysis and gas separations.

In the early 1960's Drs. Loeb and Sourirajan discovered a special preparative technique for casting cellulose acetate membranes whose structure consists of an ultrathin permeable skin formed on the top of a gelled porous support matrix. Such a membrane provides more permeant fluxes, i.e. the ability to maintain a rapid transmission of liquid or gas therethrough, than those obtained from conventional dense cellulose acetate membranes.

However, it is difficult to cast other polymeric materials in modified structures by the Loeb and Sourirajan technique. Even for cellulose acetate, the technique requires elaborate experimental procedure, and for gas separations the cellulose acetate membranes need to be carefully dried before use via freeze drying techniques or solvent exchanges. Furthermore, cellulose acetate membrane does not always give satisfactory results in field applications using the Loeb and Sourirajan technique. Decreases in selectivity, i.e. the ability to retain a solute and pass through a solvent, and flux are noticed as the membranes age. The cause of such failures varies with the application. In reverse osmosis it is normally attributed to compaction of the porous gelled structure of the membrane at high operating pressures, which may range from 100 to 2,000 pounds per square inch. In gas separations it is attributable to defects caused during drying of the normally wet membrane, and also to defects caused by exposure to water vapors and other polar solvents at high pressure.

An alternative to the Loeb-Sourirajan technique, well known in the art, involves the lamination of an ultrathin polymer layer to a porous support medium wherein the layers are made of different material. In function this composite membrane is similar to the Loeb-Sourirajan type membranes, but because it is comprised of two distinct laminas which can be tailored independently for their specific purposes, it offers much greater flexibility in construction and matching end use requirements.

Initial research herein involved the use of this modified technique utilizing cellulose acetate, however such attempts were not successful. Cellulose acetate, as other researchers have noticed, does not prove to be a good ultrathin film former. Thicker films were not quite as useful due to their lower flux.

Membranes with improved characteristics, made from perfluoroacylated ethyl cellulose polymers have been reported. See U.S. Pat. No. 4,008,047 (Petersen) issued Feb. 15, 1977.

Petersen demonstrated that when perfluoroacyl groups are added to ethyl cellulose, through substitution of the residual hydroxyl groups, the resultant polymers can be cast into ultrathin membranes with superior performance abilities. The perfluoroacyl ethyl cellulose polymer membranes were found to have improved blood compatability properties, and other desireable characteristics for polymers used in membrane applications.

In addition to Petersen others have reported the synthesis of cellulose polymers. British Pat. No. 1,120,373 (Park et al), published July 17, 1968 and (Ghatge et al) *Journal of Applied Polymer Science* (1984). Park et al briefly discusses synthesis of perfluoro esters of a variety of cellulose derivatives including cellulose acetate by reaction with perfluoroacyl halides. However, Park's work did not have any membrane objectives. Park's work entailed surface modifications of clothing materials. They found that the modified polymers had lower surface energy and provided better resistance to staining and soiling when applied to clothing articles. The synthesis disclosed in Park et al did not result in a high degree of fluorination of the cellulose derivate, that content being only about one percent (1%) by weight. Recently Ghatge et al described a modified cellulose acetate polymer synthesized by reacting cellulose acetate (39.9% acetyl) polymer with pheynl isocyanate, for formation of membranes used in reverse osmosis applications. Except for Park et al the use of perfluoroacyl halides for modifying cellulose acetate is not reported.

SUMMARY OF THE INVENTION

The present invention involves the creation of a new class of compounds, specifically perfluoroacyl modified cellulose acetate polymers, a novel synthesis procedure therefore, and the use of these polymers in membrane applications.

The choice of cellulose acetate as the cellulose derivative for investigation and possible improvement, was due to its high selectivity in gaseous separation applications such as enrichment of methane gas from sewage and natural gas resources, and the enrichment of oxygen from air. Those applications being areas of initial interest. It was hoped that a perfluoroacyl modification of cellulose acetate would result in a polymer having improved film casting properties, while maintaining the good selectivity of cellulose acetate. It was discovered that the perfluorinated modified cellulose acetate polymers have superior film casting properties. They are much more readily cast as flat ultrathin composite membranes, or spun into hollow fibers in either porous or non-porous configurations. Post treatment procedures involving solvent exchanges or freeze drying are completely eliminated as a result of the fluorinated modifications. In addition, it was surprisingly discovered that the fluorination produces a hydrophobic surface which yields higher gas fluxes. By increasing the solubility of oxygen containing gases, the modified fluorinated membrane results in increased gas flux rates with minimal influence on the high selectivity of the original polymer. The chemically modified membrane also had a greater flux rate in comparison with membranes of the same thickness made from unmodified cellulose acetate polymer. Modified cellulose acetate membrane also has greater selectivity in $O_2/N_2$ and $CO_2/CH_4$ gas separations than does the Petersen membrane.

A novel synthesis of perfluoroacyl modified cellulose acetate polymers was developed. Unlike the prior art the acylation of the cellulose acetate was not conducted in pyridine solvent. It was discovered that freshly distilled pyridine as a catalyst was sufficient to initiate the reaction. In the specific case of perfluorooctanoyl chloride, when used as the acylating agent, it was found that the addition of perfluorooctanoyl chloride to the reaction mixture prior to the addition of pyridine improved the yield and purity of the product.

It was also found that there was an effect on the yield of the product by the amount of acylating agent and pyridine used. Maximum yields of the modified polymer were obtained using an excess of acylating agent to cellulose acetate, and a slight excess of pyridine over acylating agent.

Use of the synthesis method herein outlined surprisingly yielded an increased fluorine content of the modified cellulose acetate polymer as compared to prior attempts to fluorinate cellulose acetate.

Thus it is an object of the present invention to produce a modified cellulose acetate polymer with improved membrane forming abilities.

It is further an object of the present invention to produce a membrane that allows increased gas flux rates while maintaining a high degree of selectivity.

It is further an object of the present invention to produce a membrane that is easier to use in gas separation applications by elimination of post treatment procedures.

It is further an object of the present invention to develop a synthesis procedure for perfluoroacyl modified cellulose acetate polymers that increases the amount of fluorination of the cellulose acetate polymer, and the purity of the polymer thus formed.

These and further objects and advantages of the present invention will become clearer in light of the following detailed description of the invention.

DESCRIPTION

1. Synthesis of the Modified Polymer

Essentially the synthesis involves the acylation of the residual hydroxyls of various grades of cellulose acetate. Perfluoroacyl halide compounds were used for the acylation of the residual hydroxyl groups to form the resultant perfluoroacyl ester groups. The general formula for the compound after the perfluoroacyl halide groups have been added to the cellulose acetate is $R-OOC(CF_2)_NCF_3$ where R represents the cellulose acetate and $-OOC(CF_2)_NCF_3$ represents the perfluoroacyl ester group wherein N, in the preferred embodiment of the invention, is a number from 0 to 6.

In the present invention four different grades of cellulose acetate, all obtained from Kodak Company were used in this research. Three of them, CA-4644 (Acetyl content 39.8%) CA-4640 (Acetyl content 39.9%), CA-4655 (Acetyl content 39.4%) were similar in acetyl content. One grade called CA 320s has much lower acetyl content (31%) and therefore a larger number of unreacted OH groups.

In the preferred method perfluoroacyl chlorides were used as the acylating agents. Perfluorobutyryl chloride (PFBC) and perfluorooctanoyl chloride (PFOC) used for perfluoro acylation were purchased from PCR Research Chemicals, Inc. Other chemicals were obtained from the Aldrich Company.

In the preferred process the acylation reaction is not conducted in pyridine solvent as had been done by prior researchers. The reasons for using pyridine as a catalyst only and not as a solvent are as follows: First, pyridine is an unstable compound and undergoes discoloration in air; Second, it is hygroscopic and the absorbed moisture deactivates the acyl halide reagent (perfluoroacyl halides, due to the presence of electronegative perfluoro moiety, are much more reactive toward $SN_2$ substitution at the halide carbon). Third, its basic characteristics allows complexation with acyl halide (perfluorooctanoyl chloride reacts violently with pyridine) which reduces the availability of the acyl halide for reaction. It was discovered that freshly distilled pyridine as a catalyst in the reactions of perfluorobutyryl chloride with cellulose acetate was sufficient to initiate the reaction. Yields in all previous reported attempts to add fluorine to cellulose acetate resulted in only low percentage fluorination via surface modifications. Surprisingly, yields of this present invention were 15-35 percent fluorine measured by elemental analysis.

Due to the variation in the solubility of different grades of cellulose acetate, and due to the variation in the reactivity of the two acyl halides towards cellulose acetate, methodology for the preparation of each grade of perfluoro modified cellulose acetate had to be discovered. Cellulose acetate grades: CA-4644, CA-4050, CA-4055 were reacted with PFBC in a 80:20 $CH_2Cl_2$/pyridine mixture. Reaction with PFBC was conducted in the presence of a catalytic amount of pyridine and the polymer solution was cooled down to approximately 10° C. before adding the acyl halide reagent. No catalyst was used in reactions of PFOC and the reaction mixture was usually warmed up to about 80° C. on a water bath for the completion of the reaction.

The order of the addition of PFBC and pyridine did not make noticeable differences in yield. However, in the preferred method, for PFOC reaction in solvents other than DMF (eg. $CH_2CO_2$/Acetone), addition of PFOC prior to the addition of pyridine improved the yield and the purity of the product. A mixture of methanol and water was used as a precipitant, although the composition of this mixture varied with the polymer in question. Acetone was used for redissolving and purifying the product in the second stage. The final product, which varied in color from shining white to dull yellow, was first dried in air and then in an oven at a temperature of approximately 80° C. The I R Spectra was used to determine the success of the reaction; the fully substituted product had a distinct absorption at 1785 cm$^{-1}$ (due to perfluoroesters) and showed complete absence of the hydroxyl peak. The film used for I R Spectrum analysis was cast on a glass plate in acetone/cyclohexanone mixture.

It was noticed in a few selective cases that the modified polymer developed an acetic acid odor on storage. It appears to be a result of improper curing, i.e. drying conditions. This disintegrated product is insoluble in most organic solvents and shows diminished perfluoroester absorption peaks on I R Analysis.

The effect of the amount of acylating agent and pyridine on the yield of the modified product was also studied. It was determined that in the preferred process a stoichiometric excess of approximately 150 percent of acylating agent is needed for complete substitution of the hydroxyl groups of cellulose acetate polymers. The amount of pyridine required was not found to be critical but for good product yield, a 30-50 percent excess of pyridine over the amount of acylating agent was required in the preferred procedure. Larger excess of pyridine resulted in discolored products. It was also noticed that there exists a correlation between the amount of reagents used for acylation and the stability of the product. The stability was judged by the odor and solubility of the product, e.g. modified cellulose acetate prepared by reacting 150 percent molar/excess of PFBC and 250 percent molar excess of pyridine—had a dull yellow color, and produced no acetic acid odor even after 6 months of storage. The results of reactions of cellulose acetate with PFOC and PFBC are contained in Table 1 below.

TABLE I

Reactions of Cellulose Acetate

| Cellulose Acetate | Solvents | Stoichiometric Amount of PFBC | Pyridine | Reaction Time | Yield | IR Spectra Hydroxyl/ Ester Peak |
|---|---|---|---|---|---|---|
| (A) with PFBC | | | | | | |
| CA 4644 | $CH_2Cl_2$/ Acetone | 1x | 2x | 100 min. | 73% | 0.80 |
| | $CH_2Cl_2$/ Acetone | 2x | 2x | 75 min. | 85% | 0.31 |
| | $CH_2Cl_2$/ Acetone | 2x | 3x | 75 min. | 93% | 0.10 |
| | $CH_2Cl_2$/ Acetone | 2x | 4x | 75 min. | 91% | 0.30 |
| | $CH_2Cl_2$/ Acetone | 2x | 6x | 65 min. | 90% | 0.24 |
| | $CH_2Cl_2$/ Acetone | 3x | 3x | 80 min. | 99% | 0.05 |
| | $CH_2Cl_2$/ Acetone | 3x | 4x | 80 min. | 99% | 0.15 |
| | $CH_2Cl_2$/ Acetone | 3x | 5x | 80 min. | 100% | 0.09 |
| | $CH_2Cl_2$/ Acetone | 3x | 6x | 80 min. | 99% | 0.08 |
| (B) with PFOC | | | | | | |
| CA 4644 | $CH_2Cl_2$/ Acetone | 1.3x | 2.5x | overnight | 46% | — |
| | $CH_2Cl_2$/ Acetone | 2x | 3x | 80 min. | 66% | — |
| | DMF | 2x | — | 75 min. | 80% | 0.11 |
| | DMF | 3x | — | 80 min. | 100% | 0.08 | x = Stoichiometric amount Added after the initial addition of PFOC

SPECIFIC EXAMPLE

1. Preparation of PFBC Modified Cellulose Acetate 5 gms of dried cellulose acetate (acetyl content 39.8 percent Kodak CA-4644) was dissolved under $N_2$ atmosphere in 30 ml acetone and 70 ml $CH_2Cl_2$ solvents in a 250 ml round bottomed flask, using magnetic stirring. At the end of the dissolution period, which was approximately 1-1½ hours, 4 ml of freshly distilled pyridine was added and the mixing continued for an additional 10-15 minutes; the reaction mixture was allowed to cool in a refrigerator for about 1 hour and then reacted with 4.5 ml of PFBC dissolved in 10 ml cold $CH_2Cl_2$ and added drop-wise from a dropping funnel over a period of 1½ hours. The modified polymer was precipitated in a mixture of 250 ml $CH_3OH$ and 83 ml $H_2O$.

The filtered polymer was redissolved in 50 ml acetone and reprecipitated by addition to a mixture of 250 ml $H_2O$ + 50 ml $CH_3OH$ in an Osterizer blender. The product was filtered, dried in air for 2 days and then in an oven at 80° C. for 12 hours. The yield of the reaction was 95-100 percent and the modified polymer showed absence of hydroxyl peak in the I R Spectrum.

Synthesis of PFBC modified CA320s cellulose acetate (acetyl content 31%), was conducted in a similar fashion except for the following changes. The solvent mixture used for dissolving the polymer consisted of 75 ml $Ch_2Cl_2$ and 25 ml Pyridine per 5 gms polymer and the second precipitant was pure water. The yield of the product was 80 percent and the modified polymer showed an hydroxyl peak along with a distinct perfluoroester peak.

2. Preparation of PFOC Modified Cellulose Acetate

.2 gms of dried cellulose acetate (CA 4644, acetyl content 39.8%) was dissolved in 50 ml DMF over a period of 1 hour. 2 ml of cold PFOC was added directly into the reaction flask, fitted with a reflux condensor, and mixing continued for an additional 30 minutes. The reaction temperature was then raised to 70°-75° C. by placing the flask in a water bath. The reaction was continued for an additional 1 hour. The modified polymer appeared as flocculant precipitate floating in the flask. The precipitate was washed with a 1 to 1 mixture of $CH_3OH$ and $H_2O$, filtered and dried in air. The polymer was purified by dissolving in 25 ml acetone and reprecipitated by adding into a mixture 30 ml $CH_3OH$ and 70 ml $H_2O$. The modified polymer was dried in air and finally in an oven at 20° C. The yield of the reaction was 95 percent. The product showed a distinct perfluoroester absorption at 1785 cm$^{-1}$ and almost complete absence of hydroxyl peak.

PROPERTIES

1. Membrane Forming Ability

It was discovered that the perfluoroacyl modified cellulose acetate polymers had superior membrane forming properties compared to unmodified cellulose acetate. These new polymers are much more readily cast as flat films or spun into hollow fibers. In their preferred form the modified polymers are cast as ultra thin films directly onto supporting substrates, with film thicknesses from 0.5 to 2.5 microns. These new polymers are also readily spun as hollow fibers in the assymetric microporous or dense skinned hollow fiber configurations, using melt spinning and solution spinning techniques. In their preferred form the microporous hollow fibers have pore dimensions of from 50 to 5,000 angstroms, when used in gas separation applications, and from 5,000 angstroms to 1 micron when used in liquid separation applications. In the present case the preferred method for obtaining hollow fibers involved wet gap solution spinning of PFBC modified polymer in a mixture of triethylene glycol (TEG) and removing the TEG by washing in alcohol and water.

Spinning, using wet or gap spinning processes, of dopes prepared from PFBC modified polymer and acetone is the preferred method for solution spinning hollow microporous fibers from the modified polymer. The physical properties of melt and wet spun PFBC modified cellulose acetate hollow fibers are contained in tables 2 and 3 below.

TABLE 2

PROPERTIES OF HOLLOW, WET-SPUN PFBC MODIFIED CELLULOSE ACETATE FIBERS

| Property | Example |
|---|---|
| TEG concentration, % | 0 |
| Denier | 117 |
| Outside diameter, in. | 0.0240 |
| Inside diameter, in. | 0.0226 |
| Tenacity, g/d | 0.69 |
| Elongation at break, % | 5.0 |
| Initial modulus, g/d | 30 |
| Tensile factor | 1.5 |

TABLE 3

PROPERTIES OF HOLLOW, MELT-SPUN PFBC FIBERS

| | Examples | | | |
|---|---|---|---|---|
| | 29 | | 45 | |
| Property | −1 | −1w | −3 | −3w |
| Resin C113-25- | 1 | 1 | 1 | 1 |
| TEG Conc., % | 40 | 40 | 60 | 60 |
| Denier | 255 | 190 | 976 | 477 |
| Diameter, mil | 10 | 8 | 11 | 11 |
| Tenacity, g/d | 0.2 | 0.5 | 0.1 | 0.4 |
| Elongation at break, % | 5 | 2 | 25 | 10 |
| Initial modulus, g/d | 32 | 33 | 3 | 16 |
| Tensile factor | 0.4 | 0.6 | 0.3 | 1.2 |

2. Membrane Characteristics

Testing of the modified cellulose acetate polymer membrane described herein was accomplished as follows: The polymer was coated on microporous Celgard ® using a mixture of either acetonitrile/cyclohexannone, Acetonitrile/DMF, Acetone/DMF, or Acetone/isopropanol. Coating was conducted at Applied Membrane Technology, Inc. using meniscus dip coating equipment at tunnel temperatures of 120° to 150° F. The permeabilities of the coated Celgard ® were measured on custom built high performance permeability equipment.

PFBC modified cellulose acetate showed a selectivity ratio for $O_2/N_2$ and for $CO_2/CH_4$. The flux of the polymer is several times that of the unmodified cellulose acetate.

The preferred application for perfluoroacyl modified cellulose acetate membranes is for use in gas separation. The PFOC modified polymer showed improvement in permeability over PFBC modified polymer but has slightly lower selectivity. Modified CA-320s polymer had much higher flux due to higher fluorine content, but again somewhat less selectivity. The fluorine content of the modified polymers varied from 15-35 percent. In all cases the end products with higher gas fluxes retained adequate gas selectivity characteristics. The permeability and flux test results of the modified cellulose acetate membranes are contained in table 4 below.

TABLE 4

RESULTS

| Polymer | Feed Gas | Feed Gas composition | Flux $10^{-6} cm^3$ (STP) $cm^2$ sec. cm (Hg) | Permeate composition |
|---|---|---|---|---|
| PFBC modified CA (4644) | $CH_4$ | — | 2.0 | — |
| | $CO_2$ | — | 31.6 | — |
| | $N_2$ | — | 1.5 | — |
| | $O_2$ | — | 6.2 | — |
| | $CH_4 + CO_2$ | 46% $CO_2$ | 16.0 | 95% $CO_2$ |
| | compressed air | 21% $O_2$ | 2.1 | 53% $O_2$ |
| PFBC modified CA (320s) | air $CH_4$ | — | 8.2 | — |
| | $CO_2$ | — | 103.2 | — |
| | $N_2$ | — | 8.6 | — |
| | $O_2$ | — | 21.7 | — |
| | $CH_4 + CO_2$ | 46% $CO_2$ | 41.1 | 95% $CO_2$ |
| | compressed air | 21% $O_2$ | 10.8 | 42% $O_2$ |
| | compressed air | 21% $O_2$ | 1.6 | 54% $O_2$ |
| PFOC modified CA (4644) | $CH_4 + CO_2$ | 46% $CO_2$ | 37.6 | 90% $CO_2$ |
| | compressed air | 21% $O_2$ | 8.9 | 45% $O_2$ |

3. Solubility of the modified polymers.

Both PFBC and PFOC modified cellulose acetate were soluble in common organic solvents such as acetone, cyclohexannone, THF, MEK, Dioxane and acetonitrile. They were insoluable in alcohols and aromatic hydrocarbons.

What is claimed is:

1. A modified cellulose acetate polymer, which comprises, a cellulose acetate polymer in which substantially all residual hydroxyl groups have been acylated to form perfluoroacyl ester groups having the general form $—OCO(CF_2)_NCF_3$, wherein N is a number from 2 to 10, and wherein the fluorine content of the polymer is at least about 15 percent by weight.

2. A thin film composite membrane, which consists of, a modified cellulose acetate polymer, in which said polymer substantially all residual hydroxyl groups have been acylated to form perfluoroacyl ester groups having the general formula $—OCO(CF_2)_NCF_3$, wherein N is a number from 2 to 10, and wherein the fluorine content of said polymer is at least about 15 percent by weight, and said polymer laminated to microporous supports forming the thin film composite membrane, and said membrane having a thickness of from 0.5 to 2.5 microns.

3. A microporous hollow fiber membrane, which consists of, microporous hollow fibers spun from a modified cellulose acetate polymer, in which said polymer substantially all residual hydroxyl groups have been acylated to perfluoroacyl ester groups having the general formula $—OCO(CF_2)_NCF_3$, wherein N is a number from 2 to 10 and wherein the fluorine content of said polymer is at least about 15 percent by by weight, said microporous hollow fibers having pore dimensions from about 50 angstroms to 1 micron.

4. A dense skinned asymetric hollow fiber membrane, which consists of, dense skinned assymetric hollow fibers spun from a modified cellulose acetate polymer, in which said polymer substantially all residual hydroxyl groups have been acylated to form perfluoroacyl ester groups having the general formula $—OCO(CF_2)_NCF_3$, wherein N is a number from 2 to 10 and wherein the fluorine content of said polymer is at least about 15 percent by weight.

5. A method of manufacturing the perfluoroacyl modified cellulose acetate as defined in claim 1, which comprises:
dissolving cellulose acetate, adding pyridine to the dissolved cellulose acetate solution using an amount of pyridine that is approximately 50 to 100 percent in excess of the perfluoroacyl halide used, combining the perfluoroacyl halide with the pyridine and cellulose acetate solution using an amount of perfluoroacyl halide that is approximately a 100 to 200 percent stoichiometric excess, precipitating the mixture of perfluoroacyl halide pyridine and cellulose acetate, and filtering the precipitate.

* * * * *